J. O. CARREY.
ENGINE.
APPLICATION FILED MAR. 27, 1919.
1,344,331.
Patented June 22, 1920.
2 SHEETS—SHEET 2.
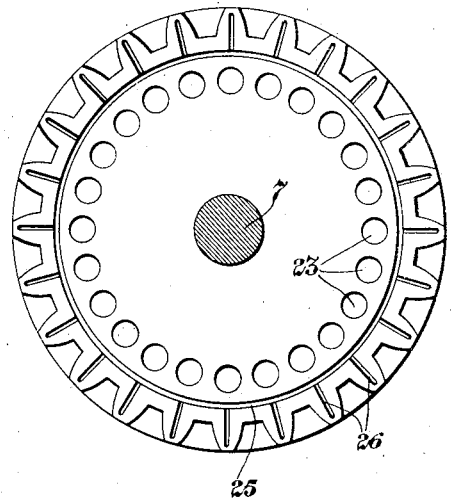
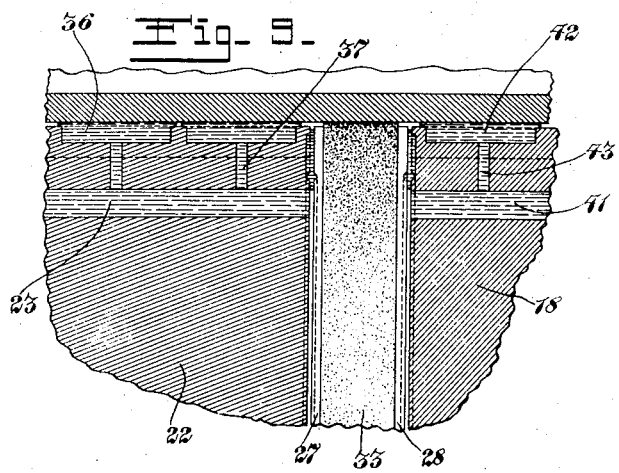
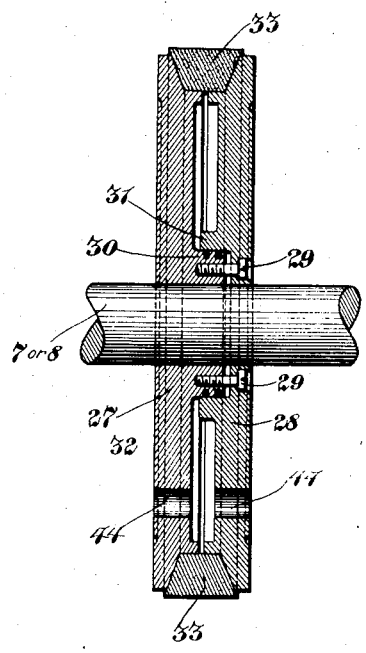
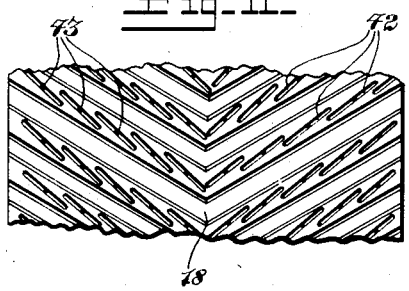
Attest:
Charles A. Bicker.
Inventor
John O. Carrey,
By Rippey & Kingsland,
His Attorneys.

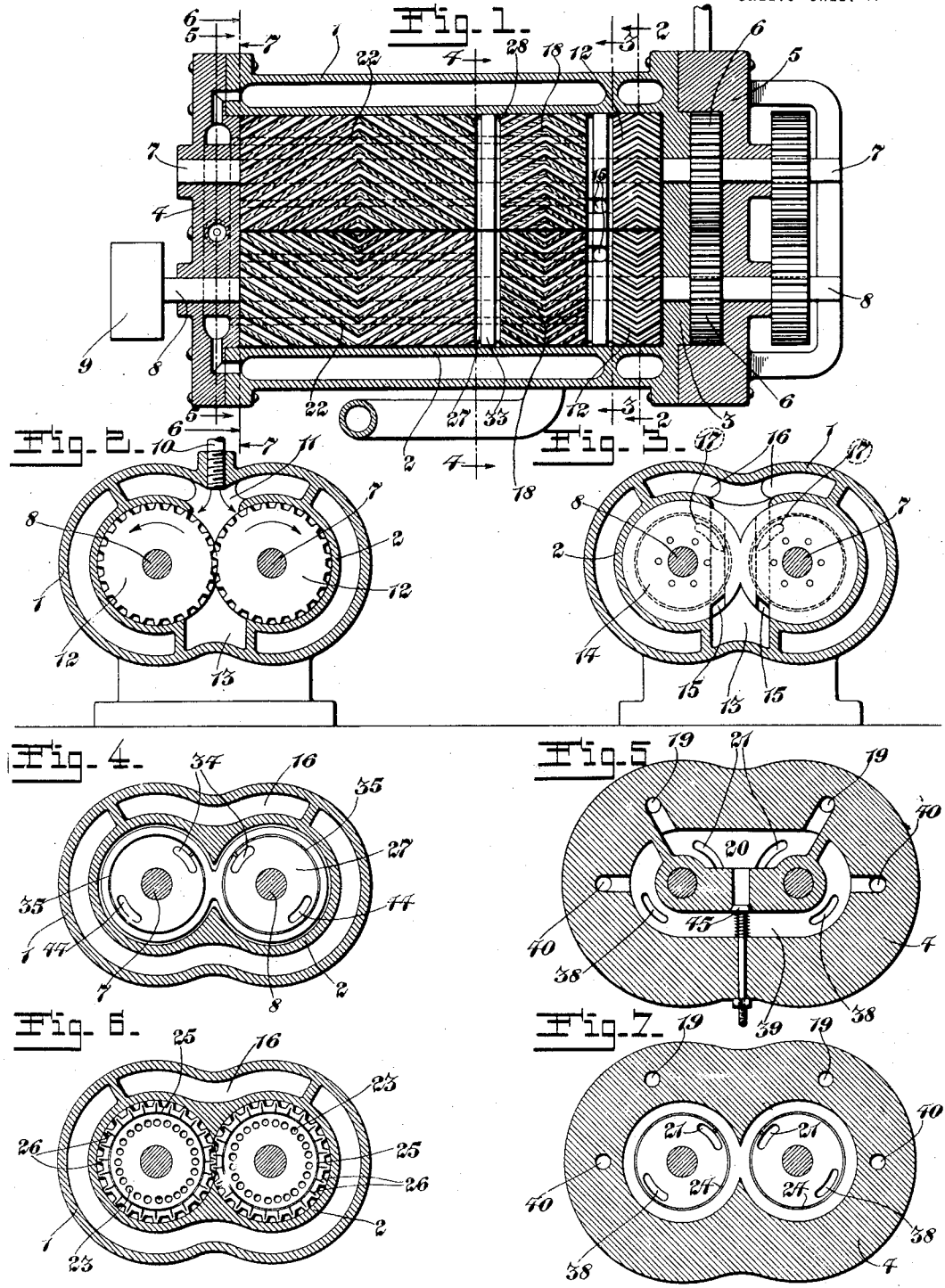

UNITED STATES PATENT OFFICE.

JOHN O. CARREY, OF ST. LOUIS, MISSOURI, ASSIGNOR TO CARREY ROTARY ENGINE COMPANY, OF ST. LOUIS, MISSOURI, A CORPORATION OF MISSOURI.

ENGINE.

1,344,331.     Specification of Letters Patent.     Patented June 22, 1920.

Original application filed February 14, 1919, Serial No. 276,995. Divided and this application filed March 27, 1919. Serial No. 285,477.

*To all whom it may concern:*

Be it known that I, JOHN O. CARREY, a citizen of the United States, residing at the city of St. Louis and State of Missouri, have invented a new and useful Engine, of which the following is a specification.

This invention relates to engines.

An object of the invention is to provide an improved engine of the rotary type comprising intermeshing rotary members of novel construction, in combination with mechanism driven thereby for supplying water or other fluid to maintain a seal between the surfaces of the rotors and the adjacent walls of the chambers in which they are inclosed.

Another object of the invention is to provide an engine of the character mentioned having an air pump comprising intermeshing rotary members and means for utilizing a part of the water to maintain a close seal between the surfaces of the pump members and the adjacent walls of the chambers in which they are inclosed.

Another object of the invention is to provide an engine of the character described constructed to utilize the circulating water to cool the operating parts of the engine.

Other objects will appear from the following description reference being made to the drawings, in which—

Figure 1 is a sectional view of the engine casing showing the arrangement of the operating parts of the engine.

Fig. 2 is a cross sectional view on the line 2—2 of Fig. 1.

Fig. 3 is a cross sectional view on the line 3—3 of Fig. 1.

Fig. 4 is a cross sectional view on the line 4—4 of Fig. 1.

Fig. 5 is a cross sectional view on the line 5—5 of Fig. 1.

Fig. 6 is a cross sectional view on the line 6—6 of Fig. 1.

Fig. 7 is a cross sectional view on the same line of Fig. 1 looking in the direction of the arrows 7—7.

Fig. 8 is an enlarged end elevation of one of the rotors.

Fig. 9 is a sectional view showing the construction by which the water is supplied to the water seal pockets in the peripheries of the engine rotors and in the peripheries of the pump members.

Fig. 10 is a sectional view showing the construction of one of the packing and partition members of the engine.

Fig. 11 is a view showing the arrangement of the water seal pockets in the peripheral edges of the pump member teeth.

This application is a division of my prior application Serial No. 276,995, filed February 14, 1919.

The engine includes an outer casing 1 inclosing two nearly cylindrical cases 2 which, as shown, may be cast integral with the casing 1 and which inclose some of the principal operating parts of the engine mechanism.

The casing thus formed has an end wall 3 which may be integral with the casing as shown. The opposite end of the casing is closed by a wall 4. A member 5 is secured to the wall 3 and has an appropriate chamber formed therein to contain a part of the engine mechanism comprising the gear wheels 6, the operation and function of which are clearly described in my said application Serial No. 276,995, and which do not require further description herein.

The shaft 7 is journaled in the end walls of the engine casing and extends concentrically through one of the cylindrical chambers in the casing. A shaft 8 is also journaled in the end walls of the casing and extends concentrically through the other cylindrical chamber parallel with the shaft 7 and is provided with means 9 for the transmission of power. The two gears 6 previously mentioned are attached to the shafts 7 and 8, respectively.

In the specific form shown it is intended to actuate the piston by heat generated by combustion, the heat being admitted to the rotor chambers so that the rotors will be driven thereby. The combustion devices and fuel supply mechanism constitute a part of the subject matter of my said application Serial No. 276,995 and are not claimed herein. It is sufficient for present purposes to understand that the rotors are driven in opposite directions. The subject-matter of the present invention consists of the water circulating means and water seal construction.

As shown in Fig. 2 water is delivered through a pipe 10 into a receiving chamber 11 from which the water is forced by the rotor pump members 12 into a chamber 13 which extends under the partition devices 14 forming one end wall of the chambers in which the pump members 12 operate. The water is forced from the chamber 13 into passages 15 which open into a passage 16 between the outer and inner casings of the engine and which also have lateral openings 17 for delivering water to the air pump members 18. Reference is made to this construction at a later point in the specification.

From the passage 16 the water passes through passages 19 into a chamber 20 formed in the end wall 4 of the engine. From the chamber 20 the water passes through passages 21 opening into the chambers in which the rotors 22 are mounted.

The rotors 22 are secured to the shafts 7 and 8 respectively. Each of the rotors 22 is of the herring bone gear type and said rotors intermesh with each other, being driven in opposite directions in the manner described in my copending application and thereby driving the remaining mechanism of the engine. The rotors are in the form of cylinders having their outer ends against the wall 4 and their inner ends against the packing partition separating the rotors from the air pump members 18. Each of the rotors is formed with an annular series of passages 23 (Figs. 6 and 8) which are brought successively into communication with the openings 21. As a result of this construction the water, which is maintained under constant pressure by the pump members 18, is forced into the passages 23. The water seal is maintained between the ends of the rotors and the wall 4, the same comprising annular grooves 24 (Fig. 7) in the end wall 4 having communication with and receiving water from the openings 21. Similar annular grooves 25 (Fig. 6) are formed in the ends of the rotors and radial grooves 26 (Fig. 8) from the grooves 25 extend into the ends of the teeth of the rotors, as shown in Fig. 8.

The rotors are separated from the pump members by a yielding partition, the construction of which will be understood by reference to Fig. 10. As shown the partition includes a wall member 27 closing the two cylindrical chambers, and a coöperating wall member 28 connected to the wall member 27 by retaining screws 29, which permit movement of the wall members toward and away from each other. The wall member 27 is formed with a hub 30 extending into a cylindrical flange 31 formed on the wall member 28. An impervious joint is formed by packing elements 32 carried in grooves in the hubs 30 and contacting with the inner surfaces of the flanges 31. A circumferential groove is formed between the outer edges of the walls 27 and 28 and in said groove appropriate yielding packing material 33 is retained, the same bearing closely against the walls of the cylindrical chambers and forming an impervious joint.

The walls 27 are formed with pockets 34 (Fig. 4) into communication with which the water passages 23 are successively brought. Annular grooves 35 are formed in the plate 27, one of said grooves being in each chamber. The grooves 35 are in communication with and receive water from the pockets 34 so that a water seal is formed between the ends of the rotors and the end wall of the chambers in which they operate similar to the water seal at the opposite end of the chambers, previously described.

Water seal pockets 36 are formed in the outer edges of the teeth of the rotors, the general construction and arrangement of which will be understood by reference to Figs. 9 and 11. Said pockets are preferably inclined relative to the teeth in which they are formed and overlap, although they do not open into or communicate directly with each other. Water is admitted into the pockets 36 through passages 37 communicating with the passages 23.

The water is discharged from the passages 23 through openings 38 (Fig. 7) in the end wall 4, said openings 38 communicating with a chamber 39 (Fig. 5) from which the water is discharged through openings 40 from which the water may be returned to the pump devices or any other suitable place of discharge.

The rotary pump members 18 are of similar construction to that of the rotors having annular series of water passages 41 (Fig. 9) receiving water from the passages 17. From the passages 41 water is conducted to water seal pockets 42 in the edges of the teeth of the pump members through passages 43. As the pump members rotate the passages 41 are brought successively into communication with openings 44 (Fig. 4) through the partition 27—28. The passages 23 in the rotors, being brought successively into communication with the openings 44, receive the water therefrom and serve as discharge openings for conducting the water to the discharge openings 38. Thus the rotors receive cold water from two different sources.

A pressure release valve 45 is mounted in a passage connecting the chamber 20 with the chamber 39, so that the pressure of the water in the chamber 20 may be relieved when the maximum desired pressure is exceeded.

While I have described my invention as utilizing water as a sealing medium it will be understood that any other appropriate fluid may be used in the place of water. In any case small globules of the fluid will adhere to the surface of the casings and may be decomposed in the gases, due to the high temperature resulting from the operation of the engine. The presence of the water seal prevents any escape or waste of the pressure.

It will be understood that the construction and arrangement described may be varied without departure from the principle of the invention. What I claim and desire to secure by Letters Patent, is:—

1. An engine comprising a casing, a pair of intermeshing rotors within the casing, passages through the rotors, chambers in the outer edges of the teeth of the rotors, a means for supplying liquid to said chambers to form a water seal between the casing and teeth of the rotors.

2. The combination of a pair of rotors having intermeshing teeth on their peripheries, with passages in the rotors, chambers formed in the peripheral portion of said teeth communicating with said passages and means for supplying fluid to said passages, and thereby to said chambers to form seals around the rotors.

3. In a rotary engine, a pair of rotors, intermeshing teeth on the peripheries of the rotors respectively, passages through the rotors, chambers formed in the peripheral portions of said teeth communicating with said passages, and means for supplying fluid to said passages and thereby to said chambers to form seals around the rotors.

4. In a rotary engine, an engine casing, a pair of rotors in said casing, intermeshing teeth on said rotors respectively, chambers formed in the peripheral surfaces of said teeth, and means for supplying fluid to said chambers to form seals between said rotors and the walls of the casing in which the rotors are mounted.

5. In an engine, a casing, a pair of rotors mounted in said casing, intermeshing teeth on said rotors respectively, liquid chambers in said teeth, passages for conducting fluid into said chambers, and mechanism driven by said rotors for forcing fluid through said passages into said chambers.

6. The combination with a casing, of rotors mounted in said casing, intermeshing teeth on said rotors, liquid seal chambers in the peripheries of said rotors, passages for conducting fluid into said chambers, and mechanism for forcing fluid through said passages into said chambers for sealing the space between the teeth of said rotors and the casing.

7. In an engine, an engine casing, rotors mounted in said casing, liquid seal chambers in the peripheries of said rotors, passages for conducting fluid into said chambers, a pump device operated by the rotors for forcing fluid through said passages into said chambers to seal the spaces between said rotors and said casing, and a yielding end wall for said casing arranged to compensate for the expansion and contraction of the rotors.

8. In an engine, an engine casing, rotors mounted in said casing, liquid seal chambers in the peripheries of said rotors, passages for conducting fluid into said chambers, a pump device operated by the rotors for forcing fluid through said passages into said chambers to seal the spaces between said rotors and said casing, a yielding end wall for said casing arranged to compensate for the expansion and contraction of the rotors, and means for holding the end wall pressed against the ends of the rotors.

9. In an engine, a casing, rotors mounted in said casing, chambers in the peripheries of said rotors, passages for conducting fluid into said chambers, rotary pump members mounted in said casing, means for driving said pump members by the rotors to force fluid through said passages into said chambers, and a yielding partition in said casing between said rotors and said pump members arranged to compensate for the expansion and contraction of said rotors.

10. In an engine, a casing, rotors mounted in said casing, chambers in the peripheries of said rotors, passages for conducting fluid into said chambers, rotary pump members mounted in said casing, means for driving said pump members by the rotors to force fluid through said passages into said chambers, a yielding partition in said casing between said rotors and said pump members arranged to compensate for the expansion and contraction of said rotors, and means for holding said partition in contact with the ends of said rotors and said pump members.

11. In a rotary engine, a casing, rotors mounted in said casing, liquid seal chambers formed in the peripheries of said rotors, passages for conducting liquid into said chambers, rotary pump members in the casing driven by said rotors to force liquid through said passages into said chambers, a partition between said rotors and said pump members, and passages through said partition for admitting liquid from said pump members into said rotors.

12. In a rotary engine, a casing, rotors mounted in said casing, liquid seal chambers formed in the peripheries of said rotors, passages for conducting liquid into said chambers, rotary pump members in the casing driven by said rotors to force liquid through said passages into said chambers, a partition between said rotors and said pump members, passages through said partition for admitting liquid from said pump members into said rotors, and means for pressing said partition into contact with both the rotors and the pump members.

13. A rotary engine, comprising a casing, a pair of rotors mounted in the casing, intermeshing teeth on said rotors respectively, passages through said rotors respectively, liquid seal chambers formed in the outer edges of said teeth, mechanism driven by the rotors for forcing liquid through said passages into said chambers, and liquid seal chambers at the ends of the rotors sealing the spaces between the ends of the rotors and the end walls of said casing.

14. In a rotary engine, a casing, rotors mounted in said casing, intermeshing teeth on said rotors respectively, means for maintaining a liquid seal between said rotors and the seal of the casing in which they are mounted, a movable wall at one end of said rotors, and means for pressing the movable wall into contact with the ends of the rotors.

15. In a rotary engine, a casing, rotors mounted in said casing, intermeshing teeth on said rotors respectively, means for maintaining a liquid seal between said rotors and the seal of the casing in which they are mounted, a movable wall at one end of said rotors, means for pressing the movable wall into contact with the ends of the rotors, and means for maintaining a liquid seal between the ends of the rotors and said movable wall.

16. In a rotary engine, a casing, rotors mounted in said casing, intermeshing teeth on said rotors respectively, means for maintaining a liquid seal between said rotors and the seal of the casing in which they are mounted, a movable wall at one end of said rotors, means for pressing the movable wall into contact with the ends of the rotors, means for maintaining a liquid seal between the ends of the rotors and said movable wall, and a passage for conducting the liquid from said rotors.

17. The combination with a casing, of a pair of rotors revolubly mounted in said casing, vanes on the periphery of said rotors having grooves therebetween, the vanes of one rotor matching the grooves of the other rotor, pockets formed on the peripheral surface of said vanes, and means for supplying fluid to said pockets to form seals between the rotors, and between the rotors of the walls of the casing in which the rotors are mounted.

18. The combination of a casing, having intersecting cylindrical chambers formed therein, with a pair of rotors mounted in said casing on parallel axes, teeth on the periphery of said rotors intermeshing in the space between the cylindrical chambers, pockets on the peripheral surfaces of the rotors, means for supplying fluid to said pockets, whereby the contiguous surface of the rotors are sealed and the spaces between the rotors and the cylindrical chamber are sealed.

19. An improvement of the class described, including a pair of rotary members arranged on parallel axes, intermeshing teeth carried by said members, respectively, pockets formed on the peripheral surface of said rotary members, and means for supplying fluid to said pockets for sealing the spaces between the contiguous teeth of the rotary members.

20. In an improvement of the class described, the combination with a casing, of rotary members mounted in said casing, fluid seal pockets in the peripheries of said rotors, passages for conducting fluid into said pockets, a pump for forcing fluid through said passages into said pockets to seal the spaces between the rotors and the spaces between the rotors and the casing, and a yielding wall for said casing arranged to compensate for the expansion and contraction of the rotors.

JOHN O. CARREY.